Sept. 6, 1966     A. SHERMAN     3,270,900
AUTOMATIC BIN DUMPING APPARATUS
Filed Dec. 31, 1964
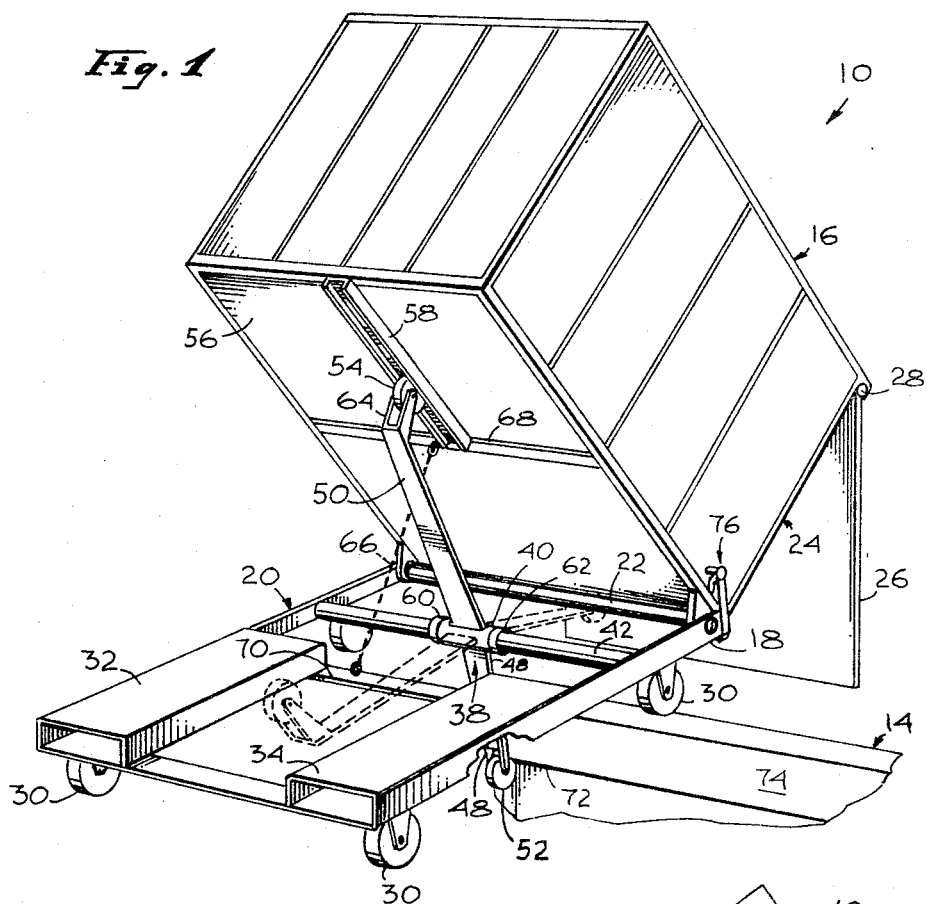
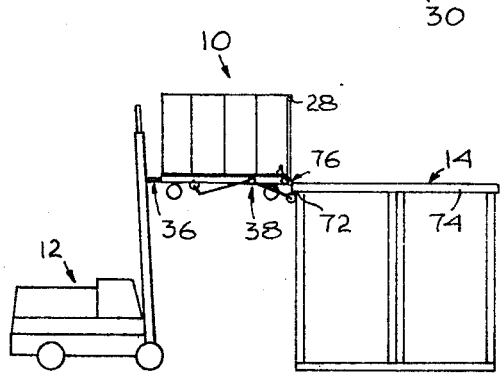
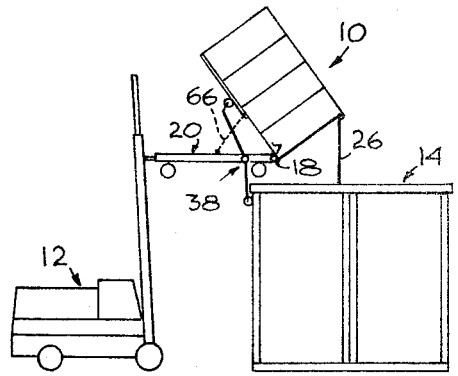
INVENTOR
ARTHUR SHERMAN
BY Allan M. Shapiro
ATTORNEY

United States Patent Office 3,270,900
Patented Sept. 6, 1966

3,270,900
AUTOMATIC BIN DUMPING APPARATUS
Arthur Sherman, Los Angeles, Calif., assignor of one-third each to Robert Gentile, Sylmar, Calif., and Leslie Kazarian, Torrance, Calif.
Filed Dec. 31, 1964, Ser. No. 422,627
11 Claims. (Cl. 214—302)

The present invention relates to automatic bin dumping apparatus and, more particularly, to novel lever means mounted on and self-contained by bin apparatus and operable in conjunction with standard lifting apparatus and transfer bodies to automatically dump the contents of the bin into the transfer body.

In the past, there have been numerous attempts to provide such bins with means for automatically dumping their contents into at least equal and usually larger containers, receptacles, transfer bodies of stationary as well as vehicular types, conveyor apparatus and so forth. However, the prior art devices have been generally unsatisfactory or unsuccessful because of excessive cost of manufacture and/or maintenance, difficulty and/or unreliability of operation and/or performance, excessive sive and/or weight, lack of versatility and adaptability in usage, as well as the lack of neatness and attractiveness of appearance.

Accordingly, it is among the objects of the present invention to overcome the foregoing deficiencies in the art.

It is a more specific object of the present invention to provide bin apparatus with a tiltable bin adapted to dump its contents through a side opening with self-contained lever means operable in conjunction with any external obstruction means whereby simple and fast selected movement of the bin automatically results in the bin being tilted by the lever means into a dumping position.

Additional and related objects of the present invention include the provision of simple, compact, lightweight, economical, reliable, and self-contained lever means for tilting a bin into a dumping position without the usage of any source of power or forces other than that normally available from and utilized by a fork-lift truck or similar apparatus normally used for lifting a dumpable bin.

In accordance with the present invention, there is provided bin apparatus adapted for automatic dumping of its contents into receiving means associated with travel obstruction means and comprising frame means adapted to be lifted and transported by fork-lift truck means or the like, container means normally resting upon the frame means and pivotally secured thereto along a forward pivotal axis edge thereof, the container means having an open front side and a front side lid in normally closed relationship thereto, and lever means pivotally mounted on the frame means and having a fulcrum axis parallel to and rearward of such forward pivotal axis, the lever means comprising forward and rearward lever arm portions extending in opposite directions from the fulcrum axis, the forward lever arm portion having a free end extending beyond the forward edge of the frame means and adapted to engage the travel obstruction means for travel limitation thereby, and the rearward lever arm portion having a free end adapted for upward force transmission engagement with the container means at least initially rearwardly of the fulcrum axis, so that, upon transportation and/or lifting of the frame means and its rested container means by such truck means until the free end of the lever arm portion engages the obstruction means followed by continuation of such lifting, the lever means pivots about its fulcrum axis and tilts the container means about its forward pivotal axis so as to dump the container contents through the open from side.

The features of the present invention which are believed to be novel are set forth with particularity in the appended claims. The present invention, both as to its organization and manner of operation, together with further objects and advantages thereof, may best be understood by reference to the following description of an exemplary form of the present invention and its application to a trash bin and the dumping of its contents into a transfer body as the receiving means, taken in conjunction with the accompanying drawings thereof, in which:

FIGURE 1 is a rear perspective view of a bin with automatic dumping apparatus in accordance with the present invention, shown in its fully tilted dumping position, the lever means being additionally indicated in dash lines for its normal position when the bin is horizontal;

FIGURE 2 is a reduced size side elevational view, primarily diagrammatic, showing the bin apparatus with its lever means in abutment contact with obstruction means of a transfer body just prior to the tilting and dumping operation; and FIGURE 3 is a view, similar in aspect to FIGURE 2, showing the bin apparatus in its fully tilted and dumping position.

Referring to the drawings, there is seen a trash bin apparatus, indicated generally at 10, in accordance with the present invention and having an open top for normal reception of trash and adapted to be lifted by a fork-lift truck 12 for automatic dumping of the contents into a transfer body 14. The trash bin apparatus 10 comprises a container body 16 which is open or openable at the top and preferably of a generally rectanguloid configuration and is pivotally mounted at or near its forward bottom edge 18 to the forward upper edge of a generally rectangular frame 20 by any convenient means such as the illustrated concentric rod and cylinder arrangement 22, the cylinder being welded to the bottom frome 20 and the rod being welded at its ends to the bottom of the container 16. The container 16 is provided with an open front side 24 and a front side lid 26 in normally completely closing relationship thereto and pivotally mounted at its upper edge 28 to the top of the front side 24 of the container 16 for automatically opening and closing as will be described hereinafter.

The bottom frame 20 is provided with a plurality of castered wheels 30 so that, during normal trash-receiving usage, the trash bin 10 may be wheeled about to various locations as desired. The frame 20 is provided with fork-receiving means comprising a pair of channel members 32 and 34 adapted to receive the pair of fork tines 36 of the fork-lift truck 12 which may be of any type well known in the art so that, upon insertion of the fork 36 into the channel members 32, 34 and raising thereof by the fork-lift truck 12, the entire trash bin 10 is raised from the ground and transportable in bulk by means of the truck 12 in any desired manner for transport to the location of the transfer body 14.

In accordance with the present invention, the bottom frame 20 is provided with lever means, indicated generally at 38, for rotatably raising the container 16 about the forward pivot means 22 and comprises a pivot collar 40 encircling a transverse pivot rod 42 at about the center thereof, the rod 42 being secured at its opposite ends to respective frame sides 44 and 46. The collar 40 is provided with lever arm means comprising a forward lever arm portion 48 and a rearward lever arm portion 50 forming a rigid unitary tilt member with the collar 40 for unitary pivotal movement about the pivot rod 42. The lever arm means is preferably provided at each of its free ends with rotatable means comprising a forward wheel 52 and a rearward wheel 54 rotatably mounted on the free forward and rearward ends of the forward portion 48 and rearward portion 50, respectively. In the embodiment illustrated, the bottom surface 56 of the container 16 is provided with a downwardly open channel member 58 which receives the wheel 54 and, together with the lock rings 60 and 62 on the pivot rod 42 which are disposed adjacent the opposite ends of the collar 40, prevent lateral movement of the lever means 38. Because of the depth of the channel member 58 illustrated, the wheel 54 is mounted on the end of the rearward lever portion 48 by means of a bracket 64 which is secured to and angled upwardly from the rearward lever portion 50; however, it should be understood that the rearward wheel 54 may be rotatably mounted directly to the end of the rearward lever portion 50 (in the same manner as the mounting of the forward wheel 52) and have a larger wheel diameter or smaller depth of the channel member 58 or both, the only criterion for the foregoing portion of the illustrated construction being that the wheel 54 be guided against lateral movement without frictional interference between the rearward lever portion 50 and the bottom surface 56 of the container 16 or any structure attached thereto. As should now be clear, lateral restraining means for the wheel 54 may be eliminated entirely if adequate means for laterally restraining the entire lever means in bulk are employed; however, the illustrated means accomplishes the objectives and eliminates the necessity for cumbersome and more expensive lateral restraining means than the lock rings 60 and 62 at the simple collar 40, the location of the latter being the only other convenient and feasible place for incorporation of such means which are necessitated by the occasional extreme lateral forces encountered during operation of the aparatus due to unequal load distribution in and of the container 16.

There is also provided tilt limit means which, in the illustrated embodiment, is seen to comprise a chain 66 having its opposite ends secured to the container 16 and the bottom frame 20 as at respective cross brace members 68 and 70. The length and location of the chain 66 are such that, as best seen in FIGURE 3, the maximum tilt angle of the container 16 with respect to the bottom frame 20 is about 45° or, in other words, such that the center of mass of the container 16 is always rearward of the forward pivotal axis at 22 so that, in the absence of tilting support by the lever means 38, the container 16 will automatically return to its resting position upon the bottom frame 20.

As best seen in FIGURE 2, the free end of the forward lever arm portion and its wheel 52 preferably project forwardly of the front side 24 of the container 16 so that, when the truck 12 brings the bin apparatus 10 into abutment with the transfer body 14 (whether the bin 10 is in its raised position shown or still at substantially ground level), the only contact between the bin apparatus 10 and the transfer body 14 is by means of the forward wheel 52 to prevent damage to either the bin apparatus 10 or the transfer body 14 because of occasionally excessive contact force as with an unskilled operator, it being noted that the present invention obviates any requirements for highly skilled operators. Accordingly, the forward wheel 52 is composed preferably of a resilient material such as rubber, and the rearward wheel 54 may be identical thereto.

In operation, referring particularly to FIGURE 2 initially, the bin apparatus 10 is lifted above the ground by means of the fork-lift truck 12 and transported from its normal location to a position adjacent the transfer body 14. Then, without any particular care needing to be exercised with respect to the bin apparatus 10 other than that it be generally directed toward the transfer body 14 with its front side 24 substantially parallel thereto, the operator of the truck 12 causes the fork 36 to be raised and the truck 12 to be moved toward the transfer body 14 until the forward wheel 52 abuts against obstruction means for preventing further travel thereof which obstruction means, in the illustrated example of a transfer body 14 of normal construction, is constituted by the horizontal downwardly disposed shoulder 72 of a lip 74 which completely encompasses the transfer body 14 at its open top edge. Normally, the height of the lip 74 above the ground is such that the truck operator has a clear and unobstructed view of the forward wheel 52 and the lip 74 from beneath the bin apparatus 10 for positive assurance of such abutment contact engagement; however, even in the absence of direct visual observation of such contact, the operator is able readily to determine the occurrence of such contact by observation of the action of the bin apparatus itself, which action is described hereinafter.

After abutment engagement of the forward wheel 52 with the transfer body lip shoulder 72, further raising of the bin apparatus 10 by the fork 36 causes the lever means 38 to commence pivoting about the fulcrum rod 42, thereby causing the rearward wheel 54 to push upwardly against the bottom of the container 16 for tilting thereof about its pivotal axis at 22. As stated before, such action is observable by the operator even in the prior absence of direct visual observation of the relationship between the forward wheel 52 and the lip 74. Further raising of the fork 36 both raises the entire bin apparatus 10 (except for the forward wheel 52) so as to clear the top of the transfer body 14 and also causes the lever means 38 to continue to smoothly raise and tilt the container 16 to its fully tilted or dumping position, as seen in FIGURE 3. In the illustrated example wherein the means for obstructing travel of the forward wheel 52 is a stationary shoulder 72 because of the nature of the exemplified transfer body 14, such continued lifting movement of the fork 36 should be accompanied by forward movement of the truck 12 in order to accommodate the relatively rearward movement of the forward lever arm portion 48 and its wheel 52 with respect to the fulcrum rod 42, which forward action of the truck 12 and bin 10 advantageously assures disposition of the forward bottom edge 18 of the container 16 over the top opening of the transfer body 14; however, it will be obvious now to those skilled in the art that relatively movable obstruction means may be employed in various other applications so that the tilting operation may be caused by merely lifting the fork 36 without any forward movement of the truck 12. The tilting of the container 16 is terminated by the tilt limit means when the chain 66 becomes taut, which fact is visually as well as otherwise observable by the operator.

As an element of the apparatus with which the present invention is not particularly concerned, there is provided latch means, indicated generally at 76, for normally retaining the front side lid 26 in closed relationship to the open front side 24 of the container 16 and automatically or otherwise operable for releasing such engagement prior to or during the tilting operation and relatching upon completion of the dumping operation and return of the container 16 to its normal horizontal position. Although many variations will occur to those skilled in the art, the illustrated latch means 76 is seen to comprise a forwardly extending tongue which is operable by being forced against the transfer body 14 or otherwise for tripping the latch and releasing the lid 26 so that, during the tilting operation, the lid 26 is freely pivotable outwardly about its upper edge 28 due to gravity.

After the contents of the container 16 have been dumped therefrom by virtue of the tilted position shown in FIGURE 3, rearward movement of the truck 12 permits the wheel 52 to disengage from the obstruction means of the transfer body 14 and, because the center of gravity of the empty container 16 is maintained rearwardly of the pivotal axis at 22 by the chain 66, the weight of the container causes it to return rearwardly to its normal horizontal position, with the lever means 38 naturally preceding it. If desired, the fork 36 may be lowered simultaneously with the rearward movement of the truck 12 so as to follow the reverse of the previously described tilting operation, thereby maintaining abutment engagement of the forward wheel 52 with the obstruction means in order to ease the container 16 gently onto the frame 20; however, because of the absence of delicate structure as permitted by the present invention as well as the advantageously instantaneous reversal of the operation achievable thereby, the container 16 may be permitted to drop onto the frame 20.

It should be noted that the pivotal rod and cylinder arrangement 22 need not be located at the forward bottom edge 18 of the container 16 but may be located rearwardly from such edge 18 so long as, when the container 16 is tilted, the bottom edge 18 does not interfere with the transfer body 14 or other receiving structure.

It should also be noted that the collar 40 may be as long transversely as the fulcrum or pivot rod 42, thus eliminating the stop rings 60 and 62. Further, the collar 40 may be provided with two or more rearward lever arm portions 50 in laterally spaced parallel relationship to each other, which may be advantageous in applications wherein the load distribution within the container 16 may be excessively unbalanced laterally, thus accommodating the uneven lateral stresses.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. Bin apparatus adapted for automatic dumping of its contents into receiving means associated with obstruction means comprising:
   frame means adapted to be lifted and transported by fork-lift truck means or the like;
   container means normally resting upon said frame means and pivotally secured to said frame means along a forward pivotal axis edge thereof, said container means having an openable front side; and
   lever means pivotally mounted on said frame means and having a fulcrum axis parallel to and rearward of such forward pivotal axis, said lever means comprising a forward lever arm portion and a rearward lever arm portion extending in opposite directions from such fulcrum axis, said forward lever arm portion having a free end extending beyond said forward edge of said frame means and adapted to engage such obstruction means for travel limitation thereby, said rearward lever arm portion having a free end adapted for upward force transmission engagement with said container means at least initially rearwardly of said fulcrum axis.

2. Bin apparatus adapted for automatic dumping of its contents into receiving means associated with obstruction means comprising:
   frame means adapted to be lifted and transported by fork-lift truck means or the like;
   container means normally resting upon said frame means and pivotally secured to said frame means along a forward pivotal axis edge thereof, said container means having an openable front side; and
   lever means pivotally mounted on said frame means and having a fulcrum axis parallel to and rearward of such forward pivotal axis, said lever means comprising a forward lever arm portion and a rearward lever arm portion extending in opposite directions from such fulcrum axis, said forward lever arm portion having a free end extending beyond said forward edge of said frame means and adapted to engage such obstruction means for travel limitation thereby, said rearward lever arm portion having a free end adapted for upward force transmission engagement with said container means at least initially rearwardly of said fulcrum axis whereby, upon transportation of said frame means and container means by such truck means until said free end of said forward lever arm portion engages such obstruction means, followed by lifting thereby, causes pivotal rotation of said lever means about such fulcrum axis for tilting of said container means about such forward pivotal axis.

3. Apparatus in accordance with claim 2 further comprising tilt limit means effectively secured to said frame means and said container means for limiting the maximum degree of such container means tilt whereby the center of gravity of said container means when empty is rearward of said forward pivotal axis for automatic return of said container means onto said frame means upon release of such upward force by said lever means.

4. Bin apparatus adapted for automatic dumping of its contents into receiving means associated with obstruction means comprising:
   frame means adapted to be lifted and transported by fork-lift truck means or the like;
   container means normally resting upon said frame means and pivotally secured to said frame means along a forward pivotal axis edge thereof, said container means having an openable front side; and
   lever means comprising a fulcrum axis rod mounted transversely on said frame means parallel to and rearward of such forward pivotal axis, a pivot collar rotatably mounted on said rod, and lever arm means integral with said collar and comprising a forward lever arm portion and a rearward lever arm portion extending in substantially opposite directions from said collar, said forward lever arm portion having a free end extending beyond said forward edge of said frame means and adapted to engage such obstruction means for travel limitation thereby, said rearward lever arm portion having a free end adapted for upward force transmission engagement with said container means at least initially rearwardly of said fulcrum axis.

5. Apparatus in accordance with claim 4 wherein said free end of said rearward lever arm portion is provided with a rotatable wheel, said wheel being in such upward force transmission engagement with the bottom of said container means.

6. Bin apparatus adapted for automatic dumping of its contents into receiving means associated with obstruction means comprising:
   substantially rectangular frame means provided with channel means for receiving the fork of a fork-lift truck means or the like whereby said apparatus may be lifted and transported thereby;
   substantially rectanguloid container means normally resting upon said frame means and pivotally secured on its bottom to said frame means along a forward pivotal axis edge of said frame means, said container means having an open front side and an openable front side lid in normally closed relationship thereto; and
   lever means pivotally mounted on said frame means and having a fulcrum axis parallel to and rearward of such forward pivotal axis, said lever means comprising a forward lever arm portion and a rearward lever arm portion extending in opposite directions from such fulcrum axis, said forward lever arm portion having a free end extending beyond said forward edge of said frame means and adapted to engage such obstruction means for travel limitation thereby, said rearward lever arm portion having a free end adapted for upward force transmission engagement with said container means at least initially rearwardly of said fulcrum axis.

7. Apparatus in accordance with claim 6 wherein said lever means is disposed underneath said container means, and
   said free end of said rearward lever arm portion is provided with a rotatable wheel, said wheel being in such upward force transmission engagement with the bottom of said container means.

8. Bin apparatus adapted for automatic dumping of its contents into receiving means associated with obstruction means comprising:

substantially rectangular frame means provided with channel means for receiving the fork of a fork-lift truck means or the like whereby said apparatus may be lifted and transported thereby;

substantially rectanguloid container means normally resting upon said frame means and pivotally secured on its bottom to said frame means along a forward pivotal axis edge of said frame means, said container means having an open front side and openable front side lid in normally closed relationship thereto; and lever means comprising a fulcrum axis rod mounted transversely on said frame means parallel to and rearward of such forward pivotal axis, a pivot collar rotatably mounted on said rod, and lever arm means integral with said collar and comprising a forward lever arm portion and a rearward lever arm portion extending in substantially opposite directions from said collar, said forward lever arm portion having a free end extending beyond said forward edge of said frame means and adapted to engage such obstruction means for travel limitation thereby, said rearward lever arm portion having a free end adapted for upward force transmission engagement with said container means at least initially rearwardly of said fulcrum axis rod whereby, upon transportation of said frame means and container means by such truck means until said free end of said forward lever arm portion, engages such obstruction means, followed by lifting thereby, causes pivotal rotation of said lever means about such fulcrum axis for tilting of said container means about such forward pivotal axis.

9. Apparatus in accordance with claim 8 wherein said lever means is disposed underneath said container means, and said free end of said rearward lever arm portion is provided with a rotatable wheel, said wheel being in such upward force transmission engagement with the bottom of said container means.

10. Apparatus in accordance with claim 8 further comprising tilt limit means effectively secured to said frame means and said container means for limiting the maximum degree of such container means tilt whereby the center of gravity of said container means when empty is rearward of said forward pivotal axis for automatic return of said container means onto said frame means upon release of such upward force by said lever means.

11. Apparatus in accordance with claim 10 wherein said lever means is disposed underneath said container means, and said free end of said rearward lever arm portion is provided with a rotatable wheel, said wheel being in such upward force transmission engagement with the bottom of said container means.

References Cited by the Examiner

UNITED STATES PATENTS 2,482,692  9/1949  Quales et al. _____ 214—620
2,555,406  6/1951  Golay.

HUGO O. SCHULZ, *Primary Examiner.*